United States Patent [19]

Sudou

[11] Patent Number: 4,782,370
[45] Date of Patent: Nov. 1, 1988

[54] ORIGINAL SUPPORTING TABLE FOR COPIER

[75] Inventor: Akira Sudou, Ayase, Japan

[73] Assignee: Fuji Photo Film Co., Ltd., Kanagawa, Japan

[21] Appl. No.: 39,843

[22] Filed: Apr. 20, 1987

[30] Foreign Application Priority Data

Apr. 18, 1986 [JP] Japan .............................. 61-57523[U]
Apr. 18, 1986 [JP] Japan .............................. 61-57524[U]

[51] Int. Cl.⁴ ............................................ G03G 15/00
[52] U.S. Cl. ...................................... 355/76; 248/447;
248/447.1; 248/458
[58] Field of Search ...................... 355/75, 76, 72, 73,
355/3 R; 248/441.1, 442.2, 444.1, 445, 447,
447.1, 447.2, 458, 362, 363

[56] References Cited

U.S. PATENT DOCUMENTS 3,717,411 2/1973 Niesen et al. ...................... 355/76 X Primary Examiner—R. L. Moses
Attorney, Agent, or Firm—Sughrue, Mion, Zinn, Macpeak & Seas

[57] ABSTRACT

An original supporting table for a copier. A turning frame having incorporated therein an original cover is mounted on the copier body for turning movement. Original glass plates are mounted respectively to both faces of the turning frame. An original retained between the original cover and one of the original glass plates facing downwardly is photographed, while a subsequent original can be set with its informational side facing up, between the original cover and the other original glass plate facing upwardly.

5 Claims, 4 Drawing Sheets

ORIGINAL SUPPORTING TABLE FOR COPIER

BACKGROUND OF THE INVENTION

The present invention relates to an original supporting table which is mounted on a copier of console type and on which an original, i.e., a subject to be duplicated, rests. The present invention is particularly suitable in application to an electro-static plate making machine in which it is required to ascertain the position of the original.

When it is desired in a conventional copier to photograph an original to duplicate the same, the original is set on an original glass plate of the copier in such a manner that the informational side of the original faces down so as to be opposed to an optical system of the copier. For this reason, it is not possible to ascertain the condition of the informational side to be duplicated. Thus, the operability is low if another informational piece is applied onto the informational side of the original to edit the same.

Apart from the above-described copiers of socalled console type, there are also copiers of type in which an original is set on an original supporting table with the informational side facing up, and the informational side is photographed and duplicated through an optical system from the position above the original. Such type of copiers have som disadvantages that the overall dimension of the height of the copier is increased, and if an informational piece is applied onto the informational side of the original as described above, the informational piece would float from the original, to thereby cause shaded areas to occur on the duplicated image.

Moreover, since it is necessary to successively set the originals on the original glass plate each time the photographing is effected, much time and labor are required for the photographing preparation operation, and the operability is low if a great number of originals is duplicated.

OBJECT OF THE INVENTION

It is an object of the present invention to provide an original supporting table for a copier, which enables an original to be set with its informational side facing up and which enables the subsequent original to be set during photographing of a previous original, to thereby attempt to enhance the efficiency of the duplicating operation.

SUMMARY OF THE INVENTION

According to the invention, there is provided an original supporting table for a copier having a copier body of such a type that a original is duplicated with its informational side facing down, the original supporting table comprising a turning frame mounted on the copier body through turning shafts for turning movement around their respective axes, an original cover incorporated in the turning frame, and a pair of original glass plates opposed to the original cover and mounted respectively to both faces of the turning frame so as to be capable of being opened and closed, originals being able to be clamped respectively between the pair of original glass plates and the original cover.

Specifically, the duplicating operation is performed with respect to the original having its informational side facing down and clamped between the original cover and the original glass plate facing downwardly. During this duplicating operation, the original glass plate facing upwardly is opened, a subsequent original is rested on the original cover with the informational side of the original facing up, and the original glass plate is closed and fixed to the turning frame, to thereby stand ready for the subsequent duplicating operation.

BRIEF DESCRIPTION OF THE DRAWINGS

The foregoing and other objects are effected by the invention as will be apparent from the following description and claims taken in connection with the accompanying drawings, forming a part of this application, in which:

DETAILED DESCRIPTION OF THE PREFERRED EMBODIMENT

Figure 1:
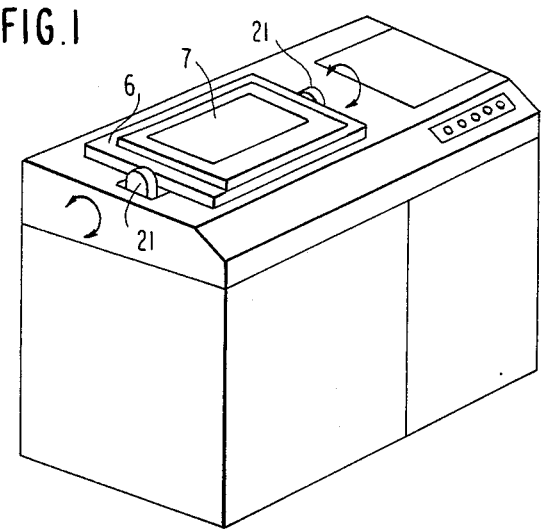
FIG. 1 is a perspective view showing an appearance of an electro-static plate making machine to which a first embodiment of the invention is applied.
Figure 2:
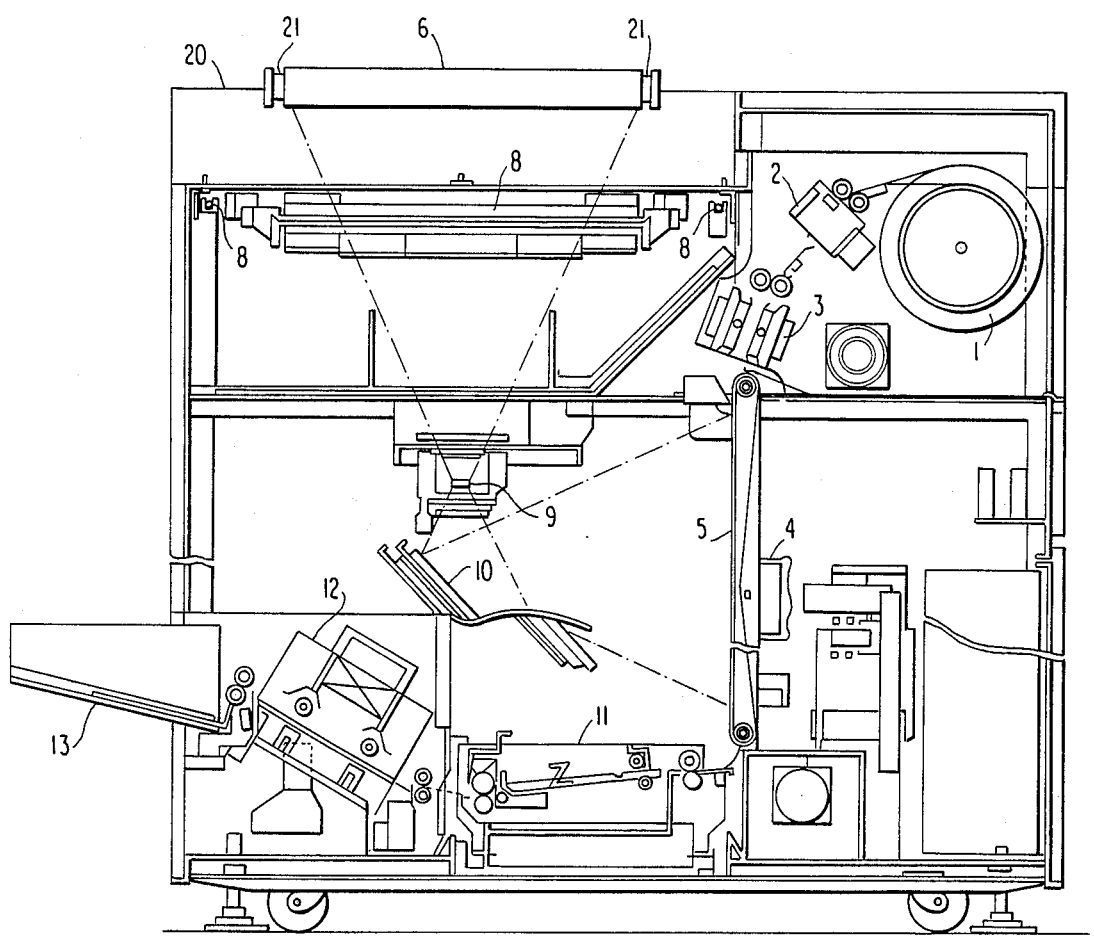
FIG. 2 is a cross-sectional view showing the internal construction of the machine.
Figure 3:
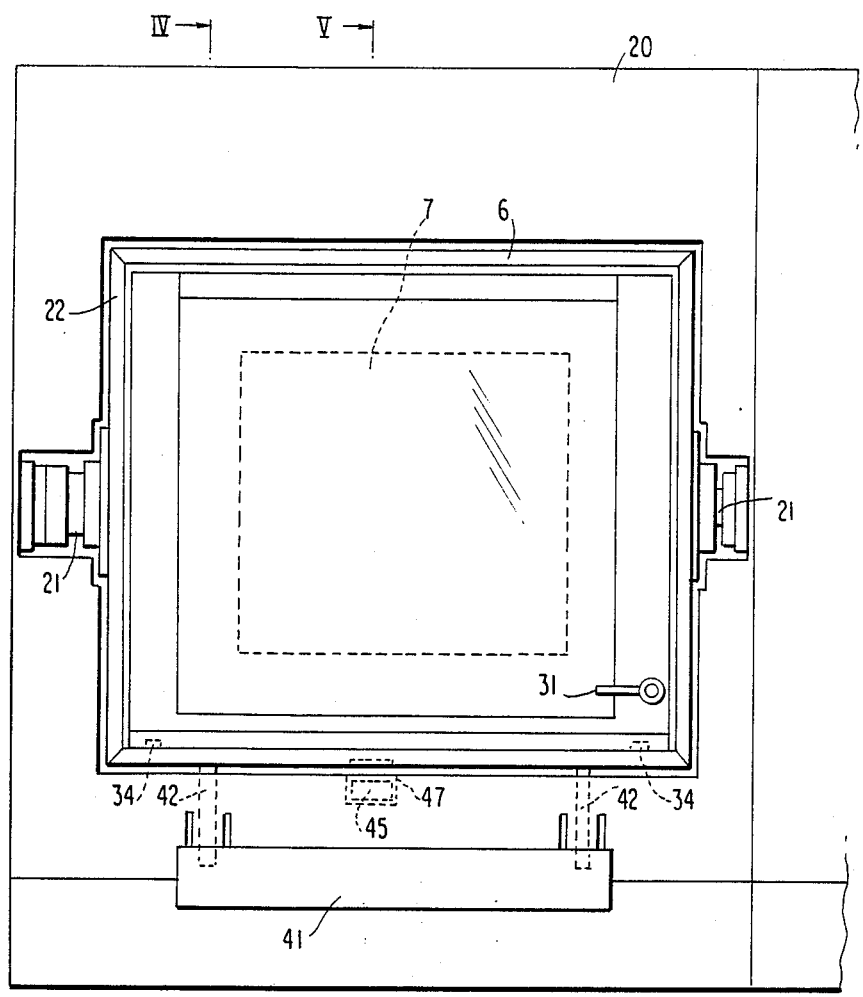
FIG. 3 is a top plan view showing an original supporting table of the machine.
Figure 4:
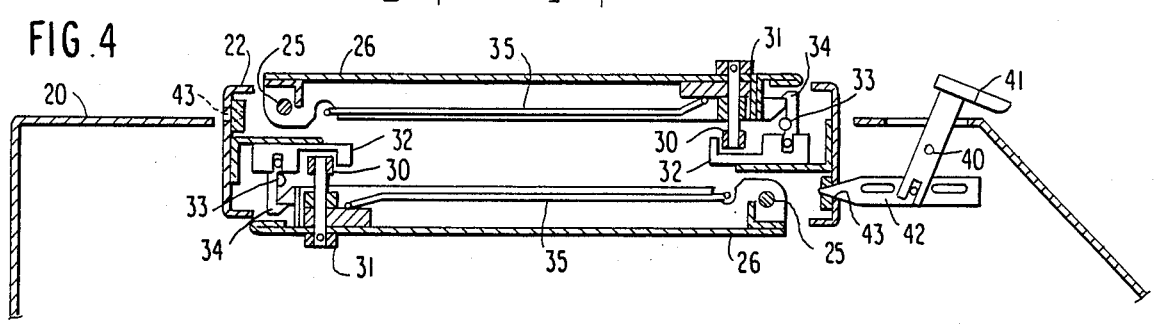
FIG. 4 is a cross-sectional view taken along the line IV—IV in FIG. 3.
Figure 5:
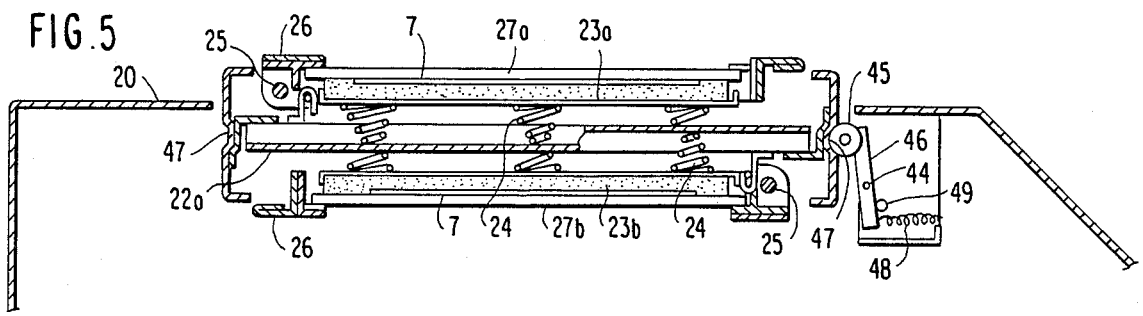
FIG. 5 is a cross-sectional view taken along the line V—V in FIG. 3.
Figure 6:
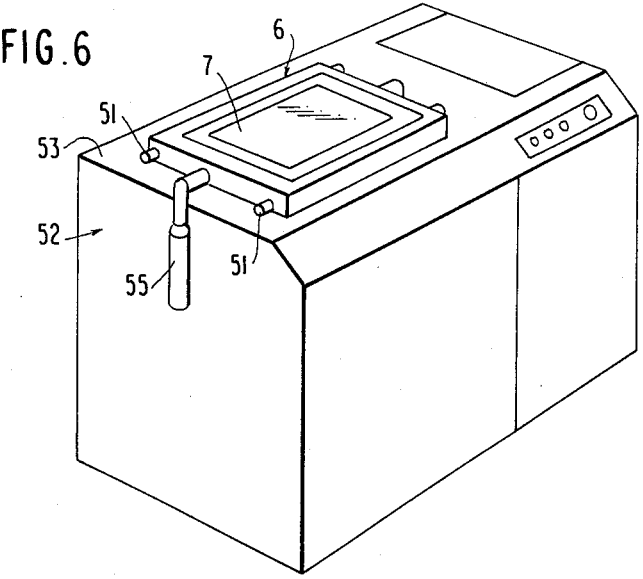
FIG. 6 is a perspective view showing an appearance of an electro-static plate making machine to which a second embodiment of the invention is applied.
Figure 7:
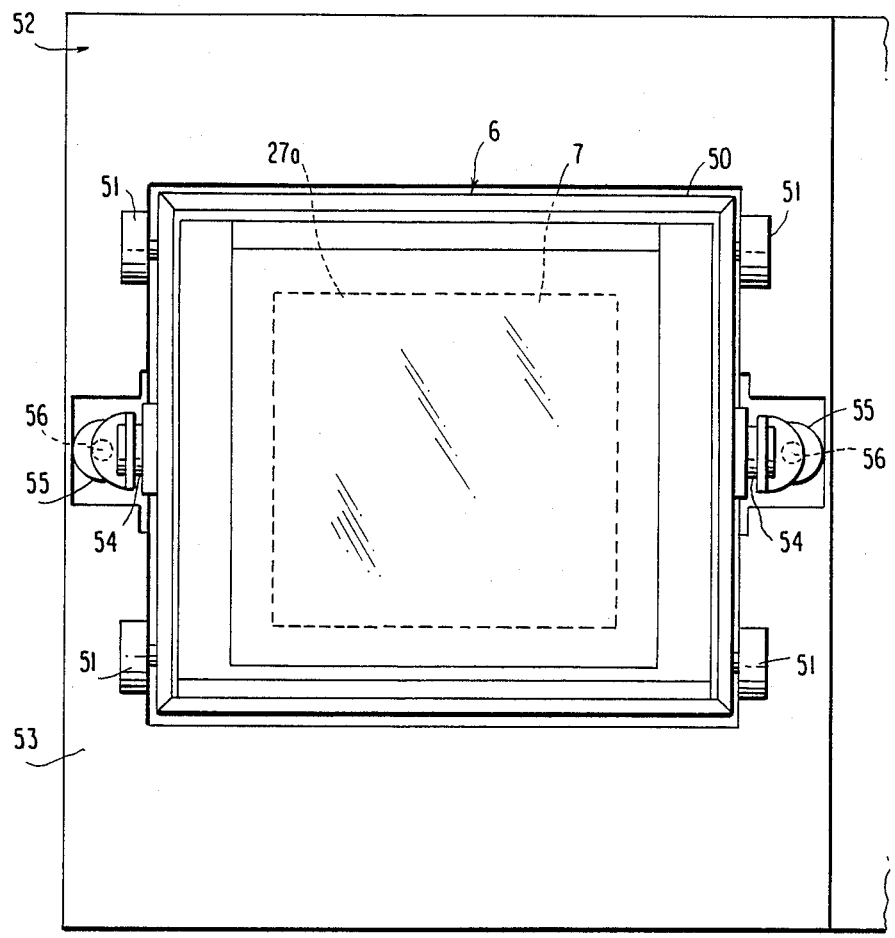
FIG. 7 is a top plan view of an original supporting table of the machine illustrated in FIG. 6.

A first embodiment of the invention applied to an electro-static plate making machine as a copier will be described with reference to FIGS. 1 through 5.

The electro-static plate making machine is a copier which duplicates an original to make a plate for offset printing, unlike a so-called duplicating machine in which an article duplicated from an original is a final, duplicated one. Specifically, in the electro-static plate making machine, a master paper 1 (zinc oxide paper, for example) wound in the form of a roll is fed out and is cut to an appropriate length by a cutter 2. The cut paper 1 is directly charged by an electrostatic charger 3 due to corona charge, and then is temporarily held against an exposure platen 5 by negative pressure introduced through a suction duct 4. On the other hand, an original 7 supported on an original supporting table 6 is illuminated by lamps 8, to project an original image onto the master paper 1 on the exposure platen 5 through an optical system comprised of a lens 9 and a mirror 10, to thereby form a latent image. The latent image is developed by a development unit 11 and, subsequently, is fixed by a fixing unit 12. The master paper 1 is dried during the passage through the fixing unit 12, and is discharged as a plate into a receiving tray 13. In this manner, the image is formed on the master paper 1 having duplicated thereon the original image, by water repellent material (vinyl acetate, for example) contained in the liquid developer, and the remaining areas on the master paper 1 are etched to have a hydrophilic property. Accordingly, as humidifying water is applied to the master paper 1, the plate for printing is formed in which oily ink adheres only to the image areas.

The above-described original supporting table 6 comprises a turning frame 22 which is mounted on a machine body 20 of the electro-static plate making machine, through a pair of turning shafts 21 for turning movement around their respective axes. A pair of cushion plates 23a and 23b constituting an original cover are mounted on the turning frame 22 in opposed relation to each other. These cushion plates 23a and 23b are formed of a sponge material and serve as supporting surfaces for the respective originals 7. In the illustrated embodiment, a weak tacky treatment is applied to the cushion plates 23a and 23b, to prevent the originals 7 from floating on the respective plates 23a and 23b, subsequently to be described. The weak tacky treatment is preferably effected by applying weak sticking sheets to the respective plates 23a and 23b, so that the sheets can promptly be replaced by new ones when the tackiness of the sheets is reduced by contamination or dust. In addition, the weak tacky treatment may not be applied to the entirety of each original supporting surface, but may be applied to a portion of each original supporting surface.

A plurality of conical springs 24 are interposed between cross members 22a of the turning frame 22 and each of the cushion plates 23a and 23b, to resiliently bias the cushion plates 23a and 23b away from the cross members 22a. The turning frame 22 includes a pair of frame members 26 on which a pair of transparent, original glass plates 27a and 27b are supported through pivot shafts 25, respectively, so as to be capable of being opened and closed. The original glass plates 27a and 27b are in pressure contact with the respective cushion plates 23a and 23b, with the originals 7 clamped respectively between the original glass plates and the cushion plates, to thereby enable the originals 7 to be retained in position. The resilient force of the springs 24 biasing the cushion plates 23a and 23b are utilized as the positioning and retaining force for the originals 7.

The original supporting table 6 comprises a pair of locking mechanisms with one corresponding to each of the original glass plates 27a and 27b. The locking mechanisms make it possible to hold the original glass plates 27a and 27b in pressure contact with the respective cushion plates 23a and 23b. Each locking mechanism includes an operating lever 31 pivotally mounted to the turning frame 22, a cam 30 provided at an end of the operating lever 31, a transmission block 32 mounted on the turning frame 22 for sliding movement to the right and left as viewed in FIG. 4 and engaging with the cam 30, and a hook 34 mounted to the turning frame 22 through a pin 33 and having one end engaging with the transmission block 32 and the other end engageable with the frame member 26. With each of the locking mechanisms constructed as described above, the engagement of the other end of the hook 34 with the frame member 26 makes it possible to hold a corresponding one of the original glass plates 27a and 27b in pressure contact with a corresponding one of the cushion plates 23a and 23b. Moreover, if consideration is made to the locking mechanism associated with the original glass plate 27a facing upwardly in FIGS. 4 and 5, the angular movement of the operating lever 31 causes the cam 30 to move the transmission block 32 to the left as viewed in FIG. 4. This causes the hook 34 to be angularly moved clockwise as viewed in FIG. 4 to disengage the hook 34 from the frame member 26, to thereby allow the original glass plate 27a to be opened. Of course, this is equally applicable to the locking mechanism associated with the original glass plate 27b when the same is located facing upwardly. The frame members 26 have provided respectively thereon torsion bar springs 35 each having its resilient reaction force which is slightly lower than a force required to lift up a corresponding one of the original glass plates 27a and 27b and a corresponding one of the frame members 26. The resilient reaction force of each torsion bar spring 35 serves as an auxiliary force when a corresponding one of the glass plates 27a and 27b is to be opened.

A positioning mechanism is also provided which can retain the turning frame 22 in position so as to prevent the same from angularly moving. The positioning mechanism comprises an operating lever 41 pivotally mounted to the machine body 20 through pins 40, a pair of stopper members 42 connected to the operating lever 41, two pairs of engaging bores 43 provided in the turning frame 22, one of each pair of engaging bores 43 being spaced from the other through 180 degrees with reference to the axes of the respective turning shafts 21 (FIG. 3), the stopper member 42 being insertable into one of the engaging bores 43, a lever 46 pivotally mounted to the machine body 20 through a pin 44, a roller 45 rotatably mounted on one end of the lever 46, a pair of recesses 47 provided in the turning frame 22 in spaced relation to each other through 180 degrees with reference to the axes of the respective turning shafts 21, the roller 45 being engageable with one of the recesses 47, a spring 48 for biasing the lever 46 to urge the roller 45 against one of the recesses 47, and a stopper pin 49 for restricting the range of angular movement of the lever 46. With the positioning mechanism constructed as described above, the roller 45 engages with one of the recesses 47 at a position where either one of the cushion plates 23a and 23b is opposed to the lens 9, so that the turning frame 22 is located in position. Under the condition, the operating lever 41 is operated to insert the stopper members 42 into the respective engaging bores 43, to thereby enable the turning frame 22 to be retained from angular movement. When the operating lever 41 is operated to disengage the stopper members 42 from the respective engaging bores 43, the turning frame 22 is allowed to be turned to oppose the other cushion plate to the lens 9.

The operation of the original supporting table 6 of the above construction will be described hereunder. At the outset, an operator releases the retention of the frame member 26 due to the locking mechanism associated with the original glass plate 27a located at the top surface of the electro-static plate making machine. Then, the operator opens the original glass plate 27a. The original 7 is clamped between the original glass plate 27a and the cushion plate 23a, with the informational side of the original 7 facing up. The original glass plate 27a is brought into pressure contact with the informational side and is retained in position by the locking mechanism. Subsequently, the turning frame 22 (that is, the original supporting table 6) is turned to oppose the informational side to the lens 9. The positioning mechanism is operated to prevent the turning frame 22 from angularly moving, and the photographing is effected. At this time, the original 7 is intimately clamped between the cushion plate 23a and the original glass plate 27a. Thus, even if an informational piece is applied to the informational side of the original 7, the informational piece is prevented from floating from the informational side, and the distance from the informational side to the lens 9 is correctly set and determined so that it is possible to clearly photograph the informational side. Furthermore, at the time of this photographing, the other cushion plate 23b is located at the top surface of the electro-static plate making machine. The operator can open the original glass plate 27b in the manner similar to that described above, to set an original 7 subsequently to be photographed, between the original glass plate 27b and the cushion plate 23b. Thus, it is possible to effect the photographing operation successively. Moreover, as described above, the weak tacky treatment is applied to each of the cushion plates 23a and 23b. This can prevent the originals 7 from floating on the respective cushion plates 23a and 23b, making it possible to easily carry out the original setting operation.

The above-described embodiment employs the conical springs 24 as resilient means and, therefore, the original supporting table 6 can have its thickness reduced. As the case may be, however, coil springs, rubber material or the like may be used. Transparent plastic plates may, for example, be used in substitution for the original glass plates 27a and 27b. Further, the locking mechanisms and the positioning mechanism should not be limited to the specific arrangements described above, but various known mechanisms may be utilized for the locking and positioning mechanisms. Moreover, it is a matter of course that the original supporting table 6 in accordance with the present invention is applicable to any other general copiers or duplicating machines in addition to the electro-static plate making machine.

In the above-described embodiment, the turning shafts 21 of the turning frame 22 are rotatably mounted on the machine body 20, but the turning frame 22 can be lifted up and down to attempt to save the space occupied by machine body 20.

A second embodiment of the invention having such feature will be described with reference to FIGS. 6 through 12.

Two pairs of rollers 51 rotatable around their respective horizontal axes are mounted respectively on both lateral sides of a turning frame 50 which constitutes a body of the original supporting table 6. Each pair of rollers 51 are located respectively at both ends of a corresponding one of the lateral sides of the turning frame 50. The original supporting table 6 is rested on the top surface (mounting surface) 53 of a machine body 52 through the rollers 51. Turning shafts 54 aligned with each other extend from centers of the respective lateral sides of the turning frame 50. Each turning shaft 54 has pivotally connected thereto a tip of an extensible rod 56 of a gas spring with shock absorber (hereinafter referred to as "gas spring") 55 which is incorporated in the machine body 52. Each gas spring 55 is assembled with the machine body 52 vertically with respect to the top surface 53 thereof, so that the extensible rod 56 can move only in (the direction vertical to the top surface 53. The remaining structure and construction of the above-described second embodiment are the same as those of the first embodiment described previously.

Figure 8:
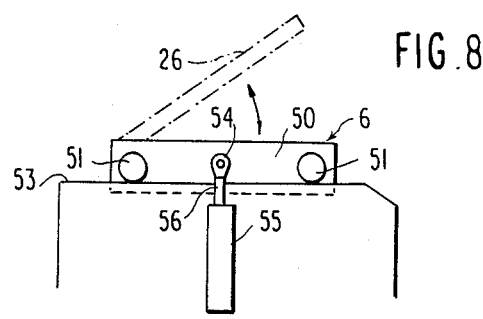
FIGS. 8 through 12 are diagrammatic views for explanation of operational steps of the original supporting table illustrated in FIG. 7.
Figure 9:
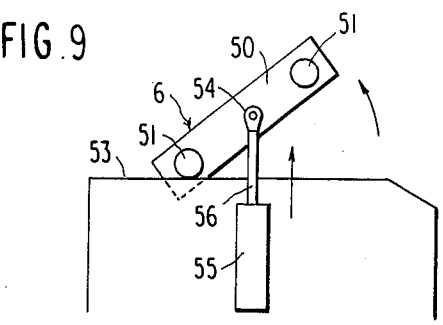
Figure 10:
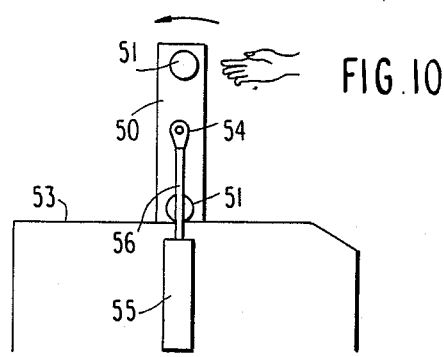
Figure 11:
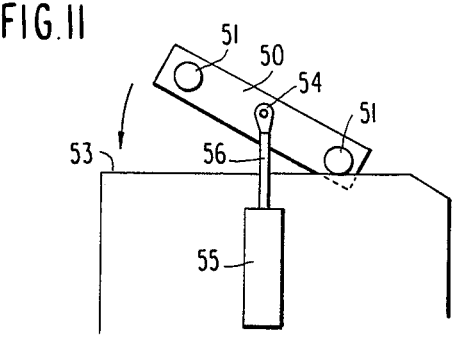
Figure 12:
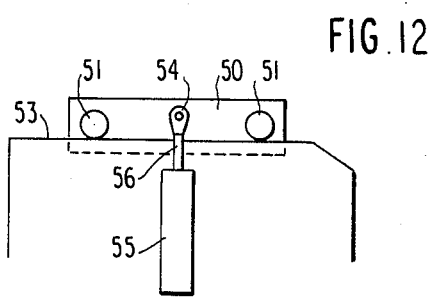

In operation, the operator releases the retention of the frame member 26 due to the locking mechanism, and then opens the original glass plate 27a located at the top surface of the electro-static plate making machine, as shown in FIG. 8. The original 7 is clamped between the original glass plate 27a and the cushion plate (corresponding to that designated by the reference numeral 23a in FIG. 5), with the informational side of the original 7 facing up. The original glass plate 27a is brought into pressure contact with the informational side and is retained in position by the locking mechanism. Subsequently, the operator gradually lifts up one end of the turning frame 50 (that is, the original supporting table 6), for example, the end of the turning frame 50 in front of the operator. Then, since the central portions of the respective lateral sides of the turning frame 50 can move only in the vertical direction by the directionality of the gas springs 55, the central portions of the respective lateral sides of the turning frame 50 move vertically, as shown in FIG. 9, and the rollers 51 at the other end of the turning frame 50 roll on the top surface 53 of the machine body and move toward the operator. In due course, as shown in FIG. 10, the turning frame 50 occupies a position vertical to the top surface 53 of the machine body. Since the upward force acts on the turning frame 50 by the gas springs 55, it is extremely easy to lift up the one end of the turning frame 50. Once the turning frame 50 occupies its generally vertical position, the operator pushes the turning frame 50 down to the opposite side. As shown in FIG. 11, the turning frame 50 gradually moves down under the reaction force from the gas springs 55, and the rollers 51 roll on the upper surface of the machine body toward the operator. The reaction force from the gas springs 55 is set to a level on the order of, for example, one fourth (¼) of the weight of the original supporting table 6. Since the moving locus of the central portion of the turning frame 50 is restrained, the turning frame 50 moves down to a predetermined position as shown in FIG. 12. That is to say, the positioning of the turning frame 50 after having been turned is unnecessary. Moreover, the turning frame 50 is located in position in the vertical direction under the own weight of the original supporting table 6. Under the condition, the informational side of the original 7 carried to the back side of the turning table 50 is opposed to the lens (corresponding to that designated by the reference numeral 9 in FIG. 2), and is brought to such a condition that the informational side can promptly be photographed as it is. In the photographing, the original 7 is intimately clamped between the cushion plate and the original glass plate 27a. Accordingly, even if an informational piece is applied to the informational side of the original 7, the informational piece is prevented from floating from the informational side, and the distance from the informational side to the lens is correctly set and determined so that it is possible to clearly photograph the informational side. Furthermore, at the time of this photographing, the other cushion plate (corresponding to that designated by the reference numeral 23b in FIG. 5) of the turning frame 50 is located at the top surface of the electro-static plate making machine. The operator can open the other original glass plate (corresponding to that designated by the reference numeral 27b in FIG. 5) in the manner similar to that described above, to set another original 7 subsequently to be photographed, between the other original glass plate and the other cushion plate. Thus, it is possible to effect the photographing operation successively.

Figure 13:
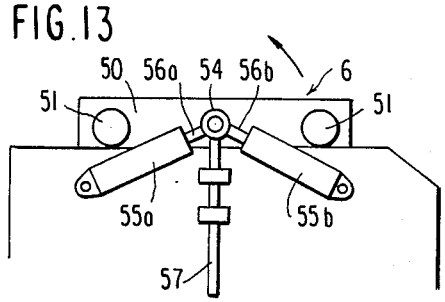
FIGS. 13 and 14 are diagrammatic views for explanation of operating steps of an original supporting table according to a third embodiment of the invention.
Figure 14:
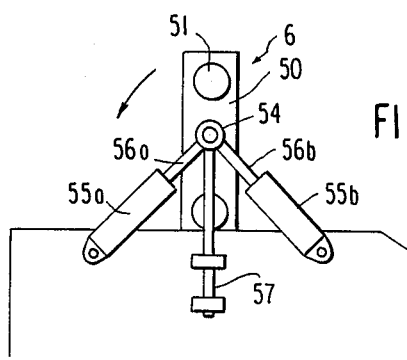

FIGS. 13 and 14 diagrammatically show the construction of a third embodiment of the invention. The third embodiment is constructed such that a pair of gas springs 55a and 55a are mounted on each lateral side of the machine body 52 so as to be inclined in symmetrical relation to each other. The gas springs 55a and 55b in each pair have their respective extensible rods 56a and 56b which have their respective tips pivotally connected to the turning shaft 54 on the central portion of a corresponding one of the lateral sides of the turning frame 50. Each of a pair of slide shafts 57 supported on the machine body 52 for only vertical movement has a tip pivotally connected to a corresponding one of the turning shafts 54. The remaining construction and the operation of the third embodiment are the same as those of the second embodiment described previously. FIG. 13 shows the turning frame 50 located in the normal, operative position, and FIG. 14 shows the turning frame 50 located at a position on the way of being turned.

While the inention has been described in its preferred embodiments, it is to be understood that the words which have been used are words of description rather than limitation and that the changes within the purview of the appended claims may be without departing from the true scope and spirits of the invention in its broader aspects.

What is claimed is:

1. An original supporting table for a copier having a copier body of such a type that an original is duplicated with its informational side facing down, said original supporting table comprising a turning frame mounted on the copier body through turning shafts for turning movement around their respective axes, an original cover incorporated in said turning frame, and a pair of original glass plates opposed to the original cover and mounted respectively to both faces of said turning frame so as to be capable of being opened and closed, originals being able to be clamped respectively between said pair of original glass plates and said original cover.

2. An original supporting table as defined in claim 1, including a positioning mechanism provided between said turning frame and said copier body for restricting the turning position of said turning frame.

3. An original supporting table as defined in claim 1, wherein said original cover comprises a pair of cushion plates opposed respectively to said original glass plates and compression spring means interposed between said cushion plates.

4. An original supporting table for a copier having a copier body of such a type that an original is duplicated with its informational side facing down, said original supporting table comprising:
   a turning frame mounted on the copier body through turning shafts for turning movement around their respective axes;
   an original cover incorporated in said turning frame;
   a pair of original glass plates opposed to the original cover and mounted respectively to both faces of said turning frame so as to be capable of being opened and closed, originals being able to be clamped respectively between said pair of original glass plates and said original cover;
   support shafts having their respective axes extending parallel to axes of the respective turning shafts and mounted respectively to opposite ends of said turning frame in a direction perpendicular to the axes of the respective turning shafts;
   rollers rotatably mounted on said turning frame through the respective support shafts and capable of rolling on a top surface of said copier body; and
   gas springs with respective shock absorbers, said gas springs having their respective lower ends pivotally connected to said copier body through respective pins, said gas springs having their respective upper ends to which said turning shafts are respectively connected, said upper ends of the respective gas springs being biased by spring force in such a direction that said upper ends are retracted, to permit the lifting up and down of said turning shafts.

5. An original supporting table for a copier having a copier body of such a type that an original is duplicated with its informational side facing down, said original supporting table comprising:
   a turning frame mounted on the copier body through turning shafts for turning movement around their respective axes;
   an original cover incorporated in said turning frame;
   a pair of original glass plates opposed to the original cover and mounted respectively to both faces of said turning frame so as to be capable of being opened and closed, originals being able to be clamped respectively between said pair of original glass plates and said original cover;
   support shafts having their respective axes extending parallel to axes of the respective turning shafts and mounted respectively to opposite ends of said turning frame in a direction perpendicular to the axes of the respective turning shafts;
   rollers rotatably mounted on said turning frame through the respective support shafts and capable of rolling on a top surface of said copier body; and
   two gas springs with respective shock absorbers and having respective lower ends fixed to said copier body so that said gas springs are extendible only in a first direction and having respective upper ends to which said turning shafts are respectively connected.

* * * * *